United States Patent Office 3,749,788
Patented July 31, 1973

3,749,788
MICROBICIDAL AND GERMICIDAL COMPOSITIONS CONTAINING N - HALOPHENYLDICHLOROISOTHIAZOLONES
Werner Toepel, Basel, Switzerland, assignor to Ciba-Geigy AG, Basel, Switzerland
No Drawing. Original application July 1, 1969, Ser. No. 838,330, now Patent No. 3,635,997, dated Jan. 18, 1972. Divided and this application Nov. 1, 1971, Ser. No. 194,572
Claims priority, application Switzerland, July 5, 1968, 10,067/68
Int. Cl. A01n 9/12, 9/22
U.S. Cl. 424—270         6 Claims

ABSTRACT OF THE DISCLOSURE

Isothiazolones of the general formula

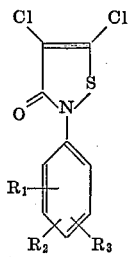

in which one of $R_1$, $R_2$ and $R_3$ represents halogen and each of the others of $R_1$, $R_2$ and $R_3$ represents hydrogen, lower alkyl, lower alkoxy, halogen, nitro, trifluoromethyl, cyano, phenoxy or halogenated phenoxy, are useful as bactericides and fungicides.

---

This is a division of application Ser. No. 838,330, filed on July 1, 1969, now U.S. Pat. No. 3,635,997.

The present invention relates to a novel process for the manufacture of compounds of Formula I

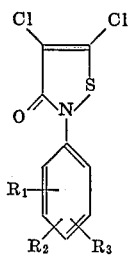

wherein $R_1$, $R_2$ and $R_3$ represent identical or different radicals selected from the group consisting of hydrogen atoms, alkyl and alkoxy groups that contain from 1 to 4 carbon atoms, halogen atoms and nitro, —$CF_3$, —CN, phenoxy or halogenophenoxy residues.

In the process of the invention, an anilide of the Formula II

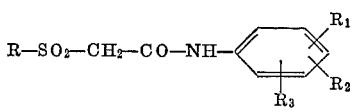

in which $R_1$, $R_2$ and $R_3$ are as defined above and R represents an alkyl or aryl residue, is reacted with carbon disulphide and a compound which has a strongly alkaline reaction, preferably an alkali hydroxide, the resulting reaction product is reacted with an alkylating agent, and the resulting intermediate product with the Formula III

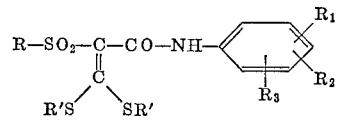

in which R, $R_1$, $R_2$ and $R_3$ are as defined above and the two symbols R' are identical and each represents a lower alkyl group, for example $CH_3$, is then treated with a chlorinating agent, for example $Cl_2$ or $SO_2Cl_2$, the resulting compound of Formula I being isolated.

In Formula II, the residue R can consist of an alkyl or an aryl residue. Preferred alkyl residues are $CH_3$ and $C_2H_5$. Preferably, however, an aryl residue is chosen, since the anilide of Formula II is preferably manufactured from a salt of a sulphinic acid and a halogenacetanilide. Alternatively, the compound of Formula II may be obtained from a reactive derivative of mercaptoacetic acid R—S—$CH_2$—COOH, for example the halide or ester, by reaction with an aniline of the Formula IV

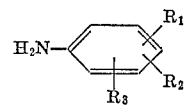

in which the symbols are as above defined with intermediate oxidation of the mercapto group to the sulphone group.

The invention also relates to the new isothiazolones of general Formula I

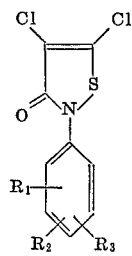

in which $R_1$, $R_2$ and $R_3$ represent identical or different radicals selected from the group consisting of hydrogen atoms, alkyl and alkoxy groups that contain from 1 to 4 carbon atoms, halogen atoms, —$CF_3$ groups and —CN groups, at least one of the radicals represented by $R_1$, $R_2$ and $R_3$ being a halogen atom.

The invention provides new germicides which contain, as the active component, a compound of the general Formula I

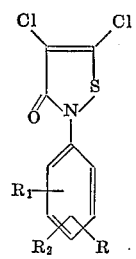

in which $R_1$, $R_2$ and $R_3$ represent identical or different radicals selected from the group consisting of hydrogen atoms, alkyl and alkoxy groups that contain from 1 to 4 carbon atoms, halogen atoms, —$CF_3$ groups and —CN groups, at least one of the radicals represented by $R_1$, $R_2$ and $R_3$ being a halogen atom. The active component of the germicide may be optionally used in admixture with one or more suitable carriers, wetting agents, emulsifying or dispersing additives and/or solvents.

The active substances of Formula I show a strong lethal action on human-pathogenic fungi and bacteria as well as on those causing a rotting of textiles, and on phytopathogenic bacteria and fungi.

Those compounds of the Formula I in which at least one of the substituents represented by $R_1$, $R_2$ and $R_3$ is in the 4-position and is a chlorine or bromine atom are preferred as active substances.

In aqueous dispersion and in organic solvents the active compounds of Formula I possess an affinity for keratin fibres and can be substantively absorbed on the fibres and can impart to the fibres a long-lasting protection against bacterial and fungal attack. In the presence of albuminous substances such as for example blood or serum, or in the presence of non-ionic, anionic or cationic surface-active compounds such as are present in soaps and synthetic wetting agents, emulsifiers or detergents, they do not lose their biocidal action. Furthermore they show no objectionable intrinsic odour, are well tolerated by healthy skin, and show no poisonous side-effects towards warm-blooded animals at the concentrations usual in disinfection.

All these properties open up a very broad field of application for the germicides of the invention in the field of detergents and cleansing agents. Thus there should be mentioned, by way of example, their use in the soap industry, is cosmetics, or generally in body care and hygiene, as disinfectants and preservatives in the most diverse industrial and natural products, and especially in detergents and cleansing agents having a disinfectant action for domestic and industrial use. At the same time they can be applied in the most diverse ways.

Examples of specific possible applications of the germicides of the invention are: their use in soap solutions, in foam baths, in preparations for washing the head and hair (shampoos), in sprays, especially foam sprays, and as solutions in organic solvents. These applications are coupled with the biocidal finish, which is mainly of an antibacterial and antimycotic nature and for example prevents bacterial and fungal infections of the hair or of the hair follicle.

The use of the detergents and cleansing agents according to the invention in the antimocrobial and antimycotic finishing of textile and non-textile fibre materials, which may be present in any processing state, and of two-dimensional structures, for example foils, is of particular interest. The treatment of natural and synthetic fibre materials is particularly important. Amongst the natural fibres there should be mentioned, besides mineral fibres such as asbestos, above all cellulose-containing fibres, for example linen, sisal, coco fibre, raffia and especially cotton, and nitrogen-containing fibres, for example leather and wool. Possible synthetic fibre materials that may be treated are polycondensates, polyadducts and polymerisation products, that is to say polymers in the broader sense. The polymer fibres can be derived from natural or synthetic polymers. Fibres from natural polymers are for example regenerated cellulose and cellulose di- to tri-acetate. Fibres derived from synthetic polymers are for example polyester, polyamide, polyurethane, polyacrylonitrile, polyvinyl chloride and polyethylene fibres. Thus it is possible to impart a lasting biocidal, preferably antibacterial and antimycotic, finish to these fibre materials by simple washing with the detergents and cleansing agents according to the invention, and thus protect them against attack by microorganisms and other pests. Fibre materials which have been finished in this way are not only themselves protected against attack by micro-organisms and fungi, but the treatment also protects their immediate environment and thus for example prevents the occurrence of unpleasant body odours and perspiration odours which are also caused by micro-organisms, this being especially of advantage in the case of fully synthetic and cellulose-containing textile fibre materials. The finish effected in this way shows good stability to chlorine and perborate.

The detergents and cleansing agents according to the invention contain, in addition to the active substance of Formula I, one or more solid or liquid additives to confer suitable properties on the composition. Such additives are for example the usual auxiliary washing agents and detergent substances. As the detergent substances there may be used surface-active compounds, for example soaps, that is to say salts of higher molecular fatty acids. Alternatively, soap-free detergent substances may be used, for example the anionic alkylarylsulphonates, tetrapropylbenzenesulphonates, fatty alcohol sulphonates, condensation products of fatty acids and methyltaurine, condensation products of fatty acids with salts of hydroxyethanesulphonic acid, fatty acid-albumen condensation products or primary alkylsulphonates, or non-ionic products, for example condensation products of alkylphenols and ethylene oxides, as well as cationic compounds.

By auxiliary washing agents there are to be understood those compounds which whilst themselves not possessing any detergent power or only a slight detergent power, do influence the washing properties of a detergent. Thus the pH-value of the wash liquor can be adjusted to an optimum by their use, or the dirt-carrying power and washing effect can be increased. Examples of such substances are electrolytes, for example trisodium phosphate, sodium diphosphate, sodium carbonate, sodium bicarbonate, sodium sulphate, sodium metasilicate or waterglass, cellulose glycollates, organic complex-forming agents (softeners), bleaching agents, optical brighteners, light protection agents, antioxidants or scents. As further constitutents, the materials according to the invention can also contain yet other biocidal substances, preferably fungicides and microbiocides. Examples of such substances are 3,4-dichlorobenzyl alcohol, ammonium compounds, for example diisobutylphenoxyethoxyethyl - dimethyl-benzyl-ammonium chloride, cetylpyridinium chloride, cetyl-trimethyl-ammonium bromide, halogenated dihydroxydiphenylmethanes, tetramethylthiuram disulphide, 2,2-thio-bis-(4,6-dichlorophenol), and also organic substances which contain the thiotrichloromethyl group, 2-nitro-2-furfuryl iodide, salicylanilides, dichlorosalicylanilides, dibromosalicylanilides, tribromosalicylanilides, tetrabromosalicylanilide, tetrachlorosalicylanilides, dichlorocyanuric acid, aliphatic thiuram sulphides, hexachlorophene-(2,2'-dihydroxy-3,5,6-3',5',6'-hexachlorodiphenylmethane), amphoteric disinfectants such as dodecyl-di(aminoethyl)-glycine hydrochloride, and also 5,6-dichlorobenzoxazolinone-(2), 2,4,4'-trichloro-2-hydroxy-diphenyl ether, iodophoric halogenophenols, 2-(furanyl) benzimidazole, 2-(thiazolyl) benzimidazole and trichlorocarbanilide.

Depending on their use, the new materials according to the invention can be in various forms, for example as blocks of soap or semi-solid and liquid soaps, as pastes, powders, emulsions, suspensions, solutions in organic solvents, as sprays, powders, granules, tablets, in capsules of gelatine and other material, or as ointments.

The amounts in which the active substances of Formula I are incorporated into the germicide compositions can vary within a wide range. In general, however, from 1 to 30 grams of active substance per litre of liquor produce the desired effect. The detergents and cleansing agents generally contain from 0.3% to 10% by weight, preferably from 0.5% to 3% by weight, of the active substance.

The following examples illustrate the invention.

EXAMPLE 1

(1) 408 g. of monochloracetic acid 4-chloranilide (2 mols) were dissolved in 500 ml. of dimethylformamide at 60° C. and 428 g. of 4-toluenesulphinic acid sodium salt dihydrate (2 mols) were introduced whilst stirring. The suspension was stirred for 5 hours at 60° C. and then stirred into ice water. The crystalline product was filtered off and dried.

(a) 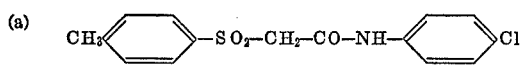

Melting point: 171–173° C. (from acetonitrile).

(2) 593 g. (=1.8 mols) of compound (a) were suspended in 1000 ml. of dimethylformamide and 290 g. of 50% strength sodium hydroxide solution (=3.6 mols) and 109 ml. of carbon disulphide (=1.8 mols) were simultaneously added dropwise whilst stirring. The temperature was kept at between 15 and 20° C. by cooling and the mix was stirred for a further 2 hours at 20–25° C. 342 ml. of dimethyl sulphate (3.6 mols) were then added dropwise, with the temperature being kept at between 25 and 30° C. After standing overnight, 4 litres of water were added. The crystalline product (b) which had separated out was filtered off and dried:

(b) 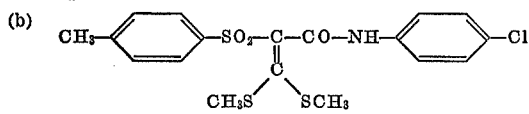

Melting point: 238–240° C. (from dimethylformamide/acetonitrile).

(3) 770 g. (=1.8 mols) of compound (b) were slowly introduced into 1000 ml. of sulphuryl chloride. A yellow solution was produced with vigorous evolution of $SO_2$, and solidified to a thick sludge on standing overnight. After 500 ml. of methylene chloride had been added, the mixture was boiled for 30 minutes under reflux. The liquid constituents were distilled off, initially at normal pressure and subsequently in vacuo. The crystalline residue was dissolved hot in acetonitrile. On cooling, the desired product (c) separated out in the form of a colourless crystal mass.

(c) 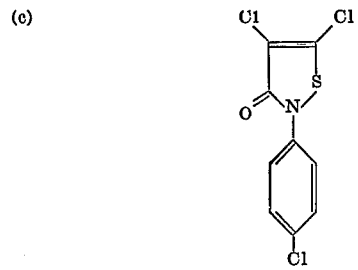

Melting point: 151–152° C. (from acetonitrile).
Analysis (percent): $Cl_{calculated}$ 37.91. $Cl_{found}$ 37.7.
[Active substance No. 1.]

The following compounds of Formula I were manufactured in the same manner, and their melting points are given in Table 1.

TABLE 1

| Active substance No. | Identity of $R_1$, $R_2$, $R_3$ Formula I [1] | Melting point, ° C. |
| --- | --- | --- |
| 2 | 4-bromo | 156–158 |
| 3 | 2-chloro-4-bromo | 173–174 |
| 4 | 3-chloro-4-methyl | 200–202 |
| 5 | 3-trifluoromethyl-4-chloro | 118–120 |
| 6 | 2,4,5-trichloro | 172–175 |
| 7 | 3-methyl-4-bromo | 172–174 |
| 8 | 4-nitro | 221–222 |
| 9 | 4-(4′-chlorophenoxy) | 146–148 |
| 10 | 4-phenoxy | |

[1] Where no identity is indicated for one or more of the three groups indicated, then it is intended that that group or those groups should represent a hydrogen atom or atoms.

EXAMPLE 2

The antibacterial activity of the active substances of Formula I was determined by the dilution test, as follows:

Bacteriostasis and bactericidal effect 20 mg. of active substance manufactured according to Example 1 were dissolved in 10 ml. of propylene glycol, and 0.25 ml. portions of the solution were added to separate 4.75 ml. batches of sterile glucose broth. Each mixture was thereafter further diluted 1:10 in a test tube. These solutions are then inoculated with *Staphylococcus aureus* or *Escherichia coli* and incubated for 48 hours at 37° C. (bacteriostasis).

After the experiment had lasted for 24 hours, 1 loop from these cultures was spread on glucose-agar plates and incubated for 24 hours at 37° C. (bactericidal effect).

After the periods indicated, the following limiting concentrations shown in Table 2 in p.p.m. were determined for bacteriostasis and bactericidal effect respectively:

TABLE 2

| Active substance No. | Staph. aur. | | Esch. coli | |
| --- | --- | --- | --- | --- |
| | Stasis | Lethal effect | Stasis | Lethal effect |
| 1 | 3 | 3 | 3 | 3 |
| 2 | 3 | 3 | 10 | 10 |

EXAMPLE 3

The following compounds of Example 1 showed the following fungistatically active limiting concentrations in p.p.m. against *Aspergillus niger* and *Rhizopus nigricans*:

| Active substance No. | Aspergillus niger | Rhizopus nigricans |
| --- | --- | --- |
| 1 | 10 | 100 |
| 2 | 30 | 30 |

The active substance No. 2 of Example 1 has an extremely broad action against various human-pathogenic bacteria and fungi; the following activities were found (minimal stock concentration [MSC] in γ/ml.).

MSC (γ/ml.)
*Strept. mitis* sp. --- 10
*Proteus vulgaris* --- 100
*Ps. aeruginosa* --- 100
*Cand. albicans* --- 10
*Rh. rubra* --- 10
*S. Cerevisiae* --- 10
*Asp. elegans* --- 10
*Trichophyton mentagrophytes* --- 10
*Trich. interdigitale* --- 10
*Pc. varioti* --- 10

EXAMPLE 4

Determination of the minimal inhibitory concentration (MIC) against bacteria and fungi in the gradient plate test [1][2]

The active substances Nos. 1, 3 and 5, in suitable formulations (for example as solutions in dimethylsulphoxide) of a certain concentration, were mixed with warm "Brain Heart Infusion Agar" (bacteria) or Mycophil-Agar (fungi) respectively. The liquid mixtures were cast on a solidified wedge-shaped base agar layer and were allowed to solidify.

The test organisms were now applied by means of a Pasteur pipette in a line at right angles to the gradient. After an incubation of 24 hours at 37° C. (for bacteria) or 72 hours at 30° C. (for fungi) respectively, the length of the germs which have grown on the inoculation line was measured and expressed in p.p.m. of active substance. The results are shown in Table 3.

[1] W. Szybalski et al., Science 116, 26 (1952).
[2] Nuesch and Knuesel, "Sideromycins," in the book by Gottlieb and Shaw, "Antibiotics, Mechanism of Action," vol. 1 (1967), Springer Verlag, Berlin and Heidelberg.

TABLE 3

| Compound No. | Minimal inhibitory concentration (p.p.m.) | | |
|---|---|---|---|
| | 1 | 3 | 5 |
| Staphylococcus aureus | 10 | >100 | 45 |
| Trichophyton mentagrophytes | 10 | 10 | 10 |
| Trichophyton rubrum | 10 | 30 | 10 |
| Epidermophyton floccosum | 10 | 10 | 10 |
| Microsporum gypseum | 10 | 10 | 10 |
| Candida albicans | 10 | >100 | >100 |

Similar results were obtained when 0.1% of base soap was mixed into the agar.

EXAMPLE 5

Textile application

Samples of 100 g. of cotton cretone were impregnated with 1% strength solutions of Compounds 1 and 2 of Example 1 in isopropanol at 20° C. on a padder and subsequently squeezed out to 100% liquor uptake.

The woven fabrics dried at 30-40° C. contain 1% of active substance relative to their intrinsic weight.

In order to test the effect against bacteria, 100 m. diameter discs of the impregnated woven fabrics, either unsoaked or after soaking for 24 hours at 29° C., were placed on Brain Heart Infusion Agar plates which had been previously inoculated with *Staphylococcus aureus* or *Escherichia coli*. The plates were thereafter incubated for 24 hours at 37° C.

In order to test the effect against fungi, 25 mm. diameter discs were placed on beer wort agar plates and subsequently inoculated with *Aspergillus niger*. The plates were then incubated for 72 hours at 30° C.

An assessment was made first of the inhibitory zone arising around the discs (HZ in mm.) and secondly of the microscopically ascertainable growth (W in percent) underneath or on the woven fabric. The results are shown in Table 4.

TABLE 4

| Compound No. | Test organism | Unsoaked | | Soaked | |
|---|---|---|---|---|---|
| | | HZ, mm. | W, percent | HZ, mm. | W, percent |
| 1 | Staphylococcus aureus | 3 | 0 | 2 | 0 |
| | Escherichia coli | 0 | 0 | 0 | 0 |
| | Aspergillus niger | 5 | 0 | 4 | 0 |
| 2 | Staphylococcus aureus | 1 | 0 | 1 | 0 |
| | Escherichia coli | 0 | 0 | 0 | 0 |
| | Aspergillus niger | 13 | 0 | 10 | 0 |

Active substance No. 1 showed a 94% protective action against *Septoria apii* infections, and active substance No. 2 showed a 100% protective effect against *Septoria apii* infections and a 95% protective effect against *Erysiphe c.* infections.

What is claimed is:

1. A bactericidal and fungicidal composition comprising (1) a bactericidally and fungicidally effective amount of a compound of the formula:

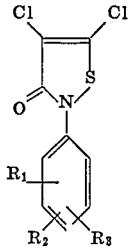

in which one of $R_1$, $R_2$ and $R_3$ represents a halogen atom and each of the others of $R_1$, $R_2$ and $R_3$ represents a hydrogen atom, and alkyl or alkoxy group that contains from 1 to 4 carbon atoms, a halogen atom, a $CF_3$ group or CN group and (2) a solvent therefore.

2. The composition according to claim 1 wherein, in the compound one of the substituents $R_1$, $R_2$ and $R_3$ is in the 4-position and represents chlorine or bromine.

3. The composition according to claim 2 in which the compound is

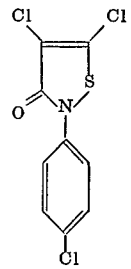

4. The composition according to claim 2 in which the compound is

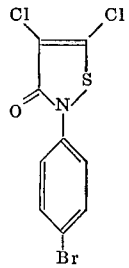

5. The composition according to claim 2 in which the compound is

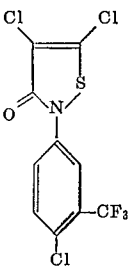

6. The composition according to claim 2 in which the compound is

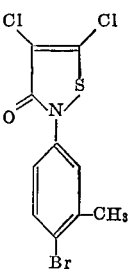

References Cited

UNITED STATES PATENTS 3,341,547  9/1967  Mailey _____ 260—302

ALBERT T. MEYERS, Primary Examiner

A. J. ROBINSON, Assistant Examiner

U.S. Cl. X.R.

252—106